No. 847,668. PATENTED MAR. 19, 1907.
A. LANG.
HEATING CARTRIDGE.
APPLICATION FILED MAY 10, 1904.
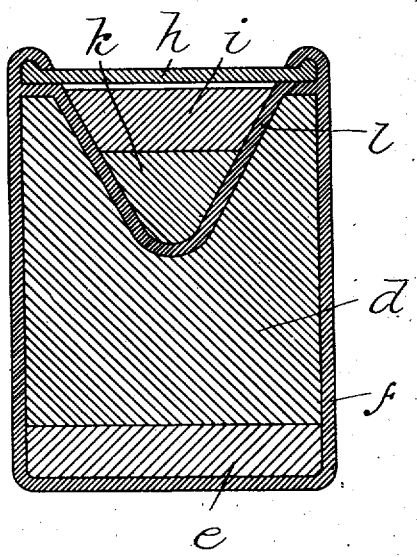
WITNESSES
INVENTOR
Albert Lang
ATTYS

UNITED STATES PATENT OFFICE.

ALBERT LANG, OF KARLSRUHE, GERMANY.

HEATING-CARTRIDGE.

No. 847,668.  Specification of Letters Patent.  Patented March 19, 1907.

Application filed May 10, 1904. Serial No. 207,320.

*To all whom it may concern:*

Be it known that I, ALBERT LANG, a subject of the Grand Duke of Baden, residing at Karlsruhe, in the Grand Duchy of Baden, Germany, have invented an Improvement in Heating-Cartridges, of which the following is a specification.

My invention relates to a cartridge for the rapid heating of fluids or mixtures of fluids by utilizing the whole of the heat developed by chemical reaction of the metals contained in the cartridge. Thus high temperatures may be created in a very short time.

The drawing shows a section through the cartridge.

The cartridge consists in the inflammable matter, the reacting material, and the protecting-head. The inflammable matter is composed of a sheet of magnesium or celluloid $h$, and a primary composition consisting of an upper readily-ignitible mass $i$ of magnesium with chlorate of potassium and an under mass or priming cap $k$, of aluminium, with a superoxid which easily delivers its oxygen, such as barium superoxid. The reacting material I consists of an admixture of aluminium or magnesium with metallic oxids or other carbon-free substances which burn without access of air. The protecting-bed $e$ consists of small plates or powdery particles of copper. To prevent the fusion of the reacting mass $d$ with the priming composition, I separate the two by a copper cap $l$. The whole is inclosed by a casing $f$, which leaves the major portion of the plate $h$ exposed.

By igniting the plate $h$ the primary composition $i$ $k$ is also ignited, and the mass $k$ burns through the copper cap $l$ and ignites the reacting material $d$. The reacting material produces such a high temperature that the reduced metals trickle together and fall to the bed $e$, which prevents them from burning through the cartridge. Said bed rapidly conducts the heat to the material to be heated.

Having now particularly described my invention, I declare that what I claim is—

1. A heating-cartridge comprising a casing, a base of slowly-fusible but freely-conducting material therein, a heating mass $d$, resting on said base, the priming composition $i$, extending into said mass $d$, a priming-cap $k$ between the mass $d$, and the priming composition $i$ and a readily-combustible igniting means.

2. A heating-cartridge comprising a casing, a base of slowly-fusible but freely-conducting material therein, a heating mass $d$ resting on said base, a copper cap $l$ on said mass $d$, a priming-cap $k$ on said copper cap $l$, the priming composition $i$ on said priming-cap $k$ and a plate of combustible material placed over the composition $i$.

In witness whereof I have hereunto set my hand in presence of two witnesses.

ALBERT LANG.

Witnesses:
SIGMUND FLEISCHMANN,
JOSEPH H. LEUTE.